US009139702B2

(12) United States Patent
Bauch et al.

(10) Patent No.: US 9,139,702 B2
(45) Date of Patent: Sep. 22, 2015

(54) METHOD FOR PRODUCING HALOGENATED POLYSILANES

(75) Inventors: Christian Bauch, Muldenstein (DE); Sven Holl, Gueckingen (DE); Rumen Deltschew, Leipzig (DE); Javad Mohsseni, Bitterfeld-Wolfen (DE); Andrey Lubentsov, Leipzig (DE)

(73) Assignee: Spawnt Private S.a.r.l. (DE)

( * ) Notice: Subject to any disclaimer, the term of this patent is extended or adjusted under 35 U.S.C. 154(b) by 273 days.

(21) Appl. No.: 13/512,999

(22) PCT Filed: Dec. 6, 2010

(86) PCT No.: PCT/EP2010/068993
§ 371 (c)(1),
(2), (4) Date: Sep. 5, 2012

(87) PCT Pub. No.: WO2011/067416
PCT Pub. Date: Jun. 9, 2011

(65) Prior Publication Data
US 2012/0319041 A1 Dec. 20, 2012

(30) Foreign Application Priority Data
Dec. 4, 2009 (DE) .................. 10 2009 056 731

(51) Int. Cl.
C01B 33/08 (2006.01)
C01B 33/02 (2006.01)
C08G 77/60 (2006.01)
C01B 33/04 (2006.01)
C01G 17/00 (2006.01)
C08G 79/14 (2006.01)

(52) U.S. Cl.
CPC ............... *C08G 77/60* (2013.01); *C01B 33/04* (2013.01); *C01G 17/00* (2013.01); *C08G 79/14* (2013.01)

(58) Field of Classification Search
USPC .......................... 423/342, 341, 349
See application file for complete search history.

(56) References Cited

U.S. PATENT DOCUMENTS

| 3,378,344 | A | | 4/1968 | Horn et al. |
|---|---|---|---|---|
| 3,401,183 | A | * | 9/1968 | Berger ........................... 556/102 |
| 3,704,261 | A | * | 11/1972 | Berger et al. .................. 556/467 |
| 3,926,833 | A | | 12/1975 | Hoffman et al. ......... 252/188.27 |
| 4,200,621 | A | | 4/1980 | Liaw et al. |
| 4,295,986 | A | | 10/1981 | Gordon |
| 4,312,849 | A | | 1/1982 | Kramer |
| 4,374,110 | A | | 2/1983 | Darnell et al. |
| 4,407,783 | A | | 10/1983 | Ulmer et al. |
| 4,499,063 | A | | 2/1985 | Grosbois et al. |
| 4,529,707 | A | | 7/1985 | Cowles et al. |
| 4,601,798 | A | * | 7/1986 | Jacubert et al. ............... 205/358 |
| 4,629,801 | A | | 12/1986 | Soula et al. |
| 4,639,361 | A | | 1/1987 | Aono et al. |
| 4,725,419 | A | | 2/1988 | Marlett et al. |
| 4,755,370 | A | | 7/1988 | Kray et al. |
| 4,762,808 | A | | 8/1988 | Sharp et al. |
| 4,777,023 | A | | 10/1988 | Fieselmann |
| 4,824,657 | A | | 4/1989 | Jadhav |
| 4,837,376 | A | | 6/1989 | Schwirtlich et al. |
| 4,855,120 | A | | 8/1989 | Marlett |
| 5,061,470 | A | | 10/1991 | Park |
| 5,126,473 | A | | 6/1992 | Klockner et al. |
| 5,455,367 | A | | 10/1995 | Klein et al. |
| 8,722,913 | B2 | | 5/2014 | Lang et al. |
| 2007/0078252 | A1 | | 4/2007 | Dioumaev |
| 2009/0068081 | A1 | * | 3/2009 | Uehara et al. ................. 423/342 |
| 2009/0169457 | A1 | * | 7/2009 | Auner et al. .................. 423/342 |
| 2010/0221169 | A1 | | 9/2010 | Knies et al. |
| 2011/0150740 | A1 | | 6/2011 | Auner et al. |
| 2011/0184205 | A1 | * | 7/2011 | Rauleder et al. .............. 556/466 |
| 2011/0284796 | A1 | | 11/2011 | Auner et al. |
| 2012/0308464 | A1 | | 12/2012 | Bauch et al. |

FOREIGN PATENT DOCUMENTS

| BE | 890.356 | 1/1982 |
|---|---|---|
| CA | 1 189 286 | 6/1985 |
| CA | 2726003 | 11/2010 |
| CN | 101107196 | 1/2008 |
| DE | 10 2009 056 731 | 6/1911 |
| DE | 340912 | 9/1921 |
| DE | 1049835 | 12/1956 |
| DE | 1 034 159 | 7/1958 |
| DE | 1 055 511 | 4/1959 |
| DE | 1 085 505 | 7/1960 |
| DE | 1 096 341 | 1/1961 |
| DE | 1 098 931 | 2/1961 |
| DE | 1 187 614 | 2/1965 |
| DE | 29 29 089 | 1/1980 |
| DE | 33 42 496 | 6/1985 |
| DE | 35 06 071 | 8/1985 |

(Continued)

OTHER PUBLICATIONS

Akhtar, M., "Preparation of Ultra-High Purity Higher Silanes and Germanes," *Synthesis and Reactivity in Inorganic, Metal-Organic, and Nano-Metal Chemistry*, 1986, vol. 16, No. 5, pp. 729-748.

(Continued)

*Primary Examiner* — James McDonough
(74) *Attorney, Agent, or Firm* — DLA Piper LLP (US)

(57) ABSTRACT

A process for preparing a halogenated polysilane $H_pSi_{n-p}X_{(2n+2)-p}$ with n=1 to 50; 0≤p≤2n+1, and X=F, Cl, Br, I, as an individual compound or a mixture of compounds, from a mixture which includes the halogenated polysilane or in which the halogenated polysilane is formed, additionally includes boron-containing impurities, wherein a) the mixture is admixed with at least 1 ppbw (parts per billion per weight) of a siloxane-forming oxidizing agent or siloxane, the boron-containing impurities forming compounds having a volatility and/or solubility different from the halogenated polysilanes, b) the halogenated polysilane is separated from the compound(s), and c) not more than 1 ppmw of water and not less than 1 ppb of siloxanes are present.

16 Claims, No Drawings

(56) References Cited

FOREIGN PATENT DOCUMENTS

| | | |
|---|---|---|
| DE | 36 35 064 | 4/1988 |
| DE | 43 13 130 | 5/1994 |
| DE | 43 06 106 | 9/1994 |
| DE | 108077 | 4/1998 |
| DE | 198 12 587 | 9/1999 |
| DE | 103 37 309 | 3/2005 |
| DE | 10 2005 024 041 | 11/2006 |
| DE | 10 2007 007 874 | 8/2008 |
| DE | 10 2008 025 260 | 12/2009 |
| DE | 10 2008 025 261 | 12/2009 |
| DE | 102008025263 | 12/2009 |
| DE | 10 2008 036 143 | 2/2010 |
| EP | 0 007 063 | 1/1980 |
| EP | 0 052 808 | 6/1982 |
| EP | 0 054 650 | 6/1982 |
| EP | 0 105 778 | 4/1984 |
| EP | 0 111 924 | 6/1984 |
| EP | 0 192 528 | 8/1986 |
| EP | 0 300 320 | 1/1989 |
| EP | 0 316 472 | 5/1989 |
| EP | 0 412 342 | 2/1991 |
| EP | 1 867 604 A1 | 12/2007 |
| FR | 1429930 | 1/1966 |
| GB | 793718 | 4/1958 |
| GB | 823483 | 11/1959 |
| GB | 823496 | 11/1959 |
| GB | 832333 | 4/1960 |
| GB | 851962 | 10/1960 |
| GB | 909950 | 11/1962 |
| GB | 922879 | 4/1963 |
| GB | 1110627 | 4/1968 |
| JP | 57-135712 | 8/1982 |
| JP | 58-500895 | 6/1983 |
| JP | 58-156522 | 9/1983 |
| JP | 59-500416 | 3/1984 |
| JP | 61-191512 | 8/1986 |
| JP | 61-205614 | 9/1986 |
| JP | 1-234316 | 9/1989 |
| JP | 4-130010 | 5/1992 |
| JP | 2002-246384 | 8/2002 |
| JP | 2009-543828 | 12/2009 |
| JP | 2010-111544 | 5/2010 |
| JP | 2011-520762 | 7/2011 |
| JP | 2011-523926 | 8/2011 |
| JP | 2013-512840 | 4/2013 |
| WO | 81/03168 | 11/1981 |
| WO | 82/04434 | 12/1982 |
| WO | 84/02332 | 6/1984 |
| WO | 03/010090 | 2/2003 |
| WO | 2005/015609 | 2/2005 |
| WO | 2007/062056 | 5/2007 |
| WO | 2007/062096 | 5/2007 |
| WO | 2008/009473 | 1/2008 |
| WO | 2008/035799 | 3/2008 |
| WO | 2008/051328 | 5/2008 |
| WO | 2009/047238 A1 | 4/2009 |
| WO | 2006/125425 A1 | 10/2009 |
| WO | 2009/143823 A2 | 12/2009 |
| WO | 2009/143824 A1 | 12/2009 |
| WO | 2009/143825 | 12/2009 |
| WO | 2011/067413 | 6/2011 |
| WO | 2011/067416 | 6/2011 |

OTHER PUBLICATIONS

Andrews, T.D. et al., "Further Studies on the Silicon-Germanium Hydrides," *J. Chem. Soc. (A)*, 1966, pp. 46-48.

Beattie, I.R. et al., "The Crystal Structure and Raman Spectrum of $Ge_5Cl_{12} \cdot GeCl_4$ and the Vibrational Spectrum of $Ge_2Cl_6$," *Inorg. Chem.*, 1998, vol. 37, pp. 6032-6034.

Bellama, J.M. et al., "Synthesis of the Hydrides of Germanium, Phosphorus, Arsenic, and Antimony by the Solid-Phase Reaction of the Corresponding Oxide with Lithium Aluminum Hydride," *Inorg. Chem.*, 1968, vol. 7, No. 10, pp. 2070-2072.

Bethke, G.W. et al., "Vibrational Spectrum of Disilane," *The Journal of Chemical Physics*, May 1957, vol. 26, No. 5, pp. 1107-1117.

Chen, J.M. et al., "X-Ray Initiated Molecular Photochemistry of Cl-Containing Absorbates on a Si(1<ce:hsp sp="0.12"/>0<ce:hsp sp="0.12"/>0) Surface Using Synchrotron Radiation," *Surface Science*, 2006, vol. 600, No. 18, pp. 3544-3549.

Chizmeshya, V.G. et al., "Synthesis of Butane-Like SiGe Hydrides: Enabling Precursors for CVD of Ge-Rich Semiconductors," *J. Am. Chem. Soc.*, 2006, vol. 128, pp. 6919-6930.

Dennis, L.M. et al., "Germanium. XXVII. Germanium Dichloride," *Journal of the American Chemical Society*, Apr. 1929, vol. 51, pp. 1151-1154.

Dennis, L.M. et al., "Germanium. VII. The Hydrides of Germanium," *Journal of the American Chemical Society*, Mar. 1924, vol. 46, pp. 657-674.

Dennis, L.M. et al., "Germanium. XXIX. Germanium Monohydride," *Journal of the American Chemical Society*, Jun. 1930, vol. 52, pp. 2369-2372.

Drake, J.E. et al., "The Preparation and Identification of Volatile Germanes," *Proceedings of the Chemical Society*, Oct. 1961, pp. 379-380.

Drake, J.E. et al., "Hydrides of Germanium," *Journal of the American Chemical Society*, 1962, pp. 2807-2813.

Fehér, V.F. et al., "Die Darstellung von Germaniumwasserstoffen aus Magnesiumgermanid und Hydraziniumchlorid in wasserfreiem Hydrazin," *Zeitschrift für Anorganische und Allgemeine Chemie*, 1958, vol. 297, pp. 14-22 (English translation of Summary only).

Finholt, A.E. et al., "The Preparation and Some Properties of Hydrides of Elements of the Fourth Group of the Periodic System and of their. Organic Derivatives," *Journal of the American Chemical Society*, Nov. 1947, vol. 69, pp. 2692-2696.

Gaspar, P.P. et al., "Preparation of Trisilane by the Schlesinger Method," *Inorganic Chemistry*, May 1970, vol. 9, No. 5, pp. 1272-1273.

Gokhale, S.D. et al., "Synthesis of the Higher Silanes and Germanes," *J. Inorg. Nucl. Chem.*, 1965, vol. 27, pp. 1911-1916.

Häberle, K. et al., "XVI *. Synthase $\alpha,\omega$-Dichlorierter Polygermane $Cl(Ph_2Ge)_nCl$ ($n$= 2,3,4,) Durch Germylen-Einschub," *Journal of Organometallic Chemistry*, 1986, vol. 312, pp. 155-165 (English translation of summary only).

Jolly, W.L. et al., "Electric Discharge Reactions of Phosphorus Trichloride and Germanium Tetrachloride," *Inorganic Chemistry*, Nov. 1962, vol. 1, No. 4, pp. 958-960.

MacKay, K.M. et al., "Studies on the Isomers of Pentagermane and Tetragermane," *J. Chem. Soc. (A)*, 1968, pp. 2312-2316.

Mackay, K.M. et al., "Silicon-Germanium Hydrides, $Si_2GeH_8$ and $SiGe_2H_8$," *J. Chem. Soc. (A)*, 1969, pp. 2937-2942.

Padma, D.K. et al., "Silicon Tetrafluoride: Preparation and Reduction with Lithium Aluminum Hydride," *Journal of Fluorine Chemistry*, 1979, vol. 14, pp. 327-329.

Ritter, C.J. et al., "Synthesis and Fundamental Studies of $(H_3Ge)_xSiH_{4-x}$ Molecules: Precursors to Semiconductor Hetero- and Nanostructures on Si," *J. Am. Chem. Soc.*, 2005, vol. 127, No. 27, pp. 9855-9864.

Royen, P. et al., "Zur Darstellung gemischter, flüchtiger Hydride der 4. und 5. Hauptgruppe," *Zeitschrift für anorganische und allgemeine Chemie*, 346, 1966, pp. 290-294 (English translation of Summary only).

Schmeisser, V.M. et al., "Über das Siliciumdichlorid $[SiCl_2],Ix^1)$," *Zeitschrift für anorganische und allgemeine Chemie*, 334, 1964, pp. 50-56 (English translation of Abstract and Summary only).

Shriver, D. et al., "The Microwave Synthesis of Digermanium Hexachloride," *Journal of the American Chemical Society*, Dec. 20, 1958, vol. 80, pp. 6692-6693.

Timms, P. L. et al., "The Silicon-Germanium Hydrides," *Journal of the Chemical Society*, 1964, pp. 1467-1475.

Timms, P.L. et al., "The Formation of Some Volatile Hydrides from Lower Oxides," *Inorganic Chemistry*, 1964, vol. 3, No. 4, pp. 606-607.

Japanese Notice of Reasons for Refusal dated Jul. 4, 2014 from corresponding Japanese Application No. 2012-541537.

European Opposition dated Jul. 29, 2014 from corresponding European Application No. 10 787 124.6.

(56) References Cited

OTHER PUBLICATIONS

Taiwan Examination Report dated May 2, 2014 from related Taiwan Application No. 099142320, along with its English translation.

Hengge, E., "Inorganic Silicon Halides," *Halogen Chemistry*, 1967, vol. 2, pp. 169-232.

Martin, G., "Researches on Silicon-Compounds. Part VI.," *J. Chem. Soc.*, 1914, vol. 105, pp. 2836-2860.

Urry, G. "Recent Developments in the Chemistry of Perchloropolysilanes," *J. Inorg. Nucl. Chem.*, 1964, vol. 26, pp. 409-414.

Auner, N., "Von Sand und Sonne zu Elekrizität und Wasserstoff," *Forschung Frankfurt*, 2010, pp. 1-6 and one sheet of English summary.

Schmeisser, M. et al., "Darstellung und chemisches Verhalten von Silliciumsubhalogeniden," *Fortschritte der chemischen Forschung* (Hefner et al.), 1967, cover, index, pp. 3-22 and one sheet of English summary.

Besson, A. et al., "Comptes Rendus Herbdomadaires des Séances de lΛAcadémie des Sciences," *Gauthier-Villars*, 1909, cover, pp. 1-7 and one sheet of English summary.

Vrandi-Piskou, D. et al., "Chromatographie en phase gazeuse des premiers membres de la série homologue $Si_nCL_{2n+2}$," *Journal of Chromatography*, 1966, pp. 449-451 and one sheet of English summary.

Höfler, F. et al., "Die Perhalgenierten Isotetrasilane $Si_4ClF_9$ und $Si_4Cl_{10}$," *Inorg. Nucl. Chem. Letters*, 1975, vol. 11, pp. 743-747 and one sheet of English summary.

Höfler, F. et al., "Darstellung und Eigenschaften einiger hochchlorierter Oligosilane," *Z. anorg. allg. Chem.*, 1977, pp. 1-8 and one sheet of English summary.

Kautsky, H. et al.,: "Die Anwendung von Hochspannungskurzchlußfunken zur chemischen Syntese," *Chemische Berichte*, 1956, cover, pp. 571-581 and one sheet of English summary.

"Prüfbericht Nr. A140002136" *AQura Analytical Solutions*, 1-2 and one sheet of English summary.

Streitberger, H-J. et al., "Verdünnungsmittel," *Römpp Online*, 2014, pp. 1-2 and one sheet of English summary.

"$^{29}Si$ NMR-Spektrum von $Si_5Cl_{12}$ (mit Verunreinigungen durch $SiCl_4$)," one page and one sheet of English summary.

Amberger, E., *Angew. Chem. 71*, No. 11, 1959, pp. 372-373, w/ brief English summary.

Lobreyer, T. et al., *Angewandte Chemie 105*, No. 4 (1993), p. 587-588, w/ brief English summary.

Royen, P. et al., ("Darstellung"), *Angew. Chem. 76*, No. 7, 1964, pp. 302-303, w/ brief English summary.

Varma, R. et al., *Angewandte Chemie 76*, (1964), p. 649, w/ brief English summary.

Royen, P. et al., *Zeitschrift für Anorganische und Allgemeine Chemie 215*, (1933), pp. 295-309. w/ brief English summary.

Royen, P, et al., *Zeitschrift für Anorganische und Allgemeine Chemie 211*, (1933), pp. 412-422, w/ brief English summary.

Schwarz. R. et al., *Zeitschrift für Anorganische und Allgemeine Chemie 275*, (1954), pp. 1-20, w/ brief English summary.

Jolly, W.L. et al., *Inorganic Syntheses*, (1963), No. 7, pp. 34-44, w/ brief English summary.

Wartenberg, *Zeitschrift für Anorganische und Allgemeine Chemie*, (1956), pp. 372-376, w/ brief English summary.

Angus, P.C. et al., *Journal of the Chemical Society*, Chemical Communications (1973), p. 127, w/ brief English summary.

\* cited by examiner

METHOD FOR PRODUCING HALOGENATED POLYSILANES

RELATED APPLICATIONS

This is a §371 of International Application No. PCT/EP2010/068993, with an international filing date of Dec. 6, 2010, which is based on German Patent Application No. 10 2009 056 731.3, filed Dec. 4, 2009, the subject matter of which is incorporated by reference.

TECHNICAL FIELD

This disclosure relates to a process for preparing halogenated polysilanes, as a pure compound or a mixture of compounds, which has a particular purity with respect to inter alia boron-containing compounds.

BACKGROUND

Halogenated polysilanes are used, for example, to generate high-purity silicon in the semiconductor technology, for example, in the solar-cell industry. For this reason, very high purities are often needed for halogenated polysilanes. WO 2009/047238 A1 describes a process for preparing high-purity hexachlorodisilane where during the distillation of a mixture comprising hexachlorodisilane, water is present in amounts of not more than 10 ppbw (parts per billion per weight). WO '238 describes how the reaction of water with chlorosilanes may lead to the formation inter alia of disiloxanes, which have deleterious consequences for the purity of the desired hexachlorodisilane.

It could therefore be helpful to prepare halogenated polysilanes with increased purity which also satisfy, for example, the requirements for applications in photovoltaics.

SUMMARY

We provide a process for preparing a halogenated polysilane $H_pSi_{n-p}X_{(2n+2)-p}$ with n=1 to 50; 0≤p≤2n+1, and X=F, Cl, Br, I, as an individual compound or a mixture of compounds, from a mixture which includes the halogenated polysilane or in which the halogenated polysilane is formed, additionally including boron-containing impurities, wherein a) the mixture is admixed with at least 1 ppbw (parts per billion per weight) of a siloxane-forming oxidizing agent or siloxane, the boron-containing impurities forming compounds having a volatility and/or solubility different from the halogenated polysilanes, and b) the halogenated polysilane is separated from the compound(s), and c) not more than 1 ppmw of water and not less than 1 ppb of siloxanes are present.

DETAILED DESCRIPTION

We provide a process for preparing a halogenated polysilanes of the general formula

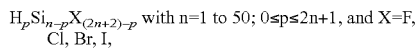

as an individual compound or a mixture of compounds from a mixture, where the mixture already comprises the halogenated polysilane, or the halogenated polysilane is formed in the mixture. The mixture may further comprise boron-containing impurities. This process comprises the process steps wherein a) the mixture is admixed with at least 1 ppbw (parts per billion per weight) of a siloxane-forming oxidizing agent or siloxane, with the boron-containing impurities with the siloxanes forming compounds having a volatility and/or solubility different from the halogenated polysilanes, and b) the halogenated polysilane is separated from these compounds, wherein, during the process, not more than 1 ppmw of water and not less than 1 ppbw of siloxanes are present.

We found that boron-containing impurities in the halogenated polysilanes, with siloxanes, and/or on addition of oxidizing agents which promote formation of siloxanes, form compounds, boric acids, for example, whose volatility and/or solubility is different from the halogenated polysilanes, with the consequence that these resulting boron-containing compounds can be separated from the halogenated polysilane in a subsequent process step b), resulting in a halogenated polysilane with increased purity.

High levels of impurities with moisture, water for example, in the case of oligosilanes and polysilanes in particular may lead to formation of explosive deposits, referred to as "poppy gels", and formation of such deposits should be avoided, or reduced. At the same time, in the presence of moisture such as water, silanols and, ultimately, polymeric products resembling silica gel may be formed as a result of polycondensation reactions and/or crosslinking, and these products are deposited in the pipelines of the reactors and may possibly result in blockages. Water also reacts, for example, undesirably with the silicon-halogen bonds in the halogenated polysilanes, while the siloxanes primarily undergo reactions with the boron-containing impurities. To reduce or even avoid formation of the unwanted "poppy gels" and silica-like deposits, not more than 1 ppmw of water is present during the process. This can be achieved, for example, by drying the halogenated polysilane mixtures introduced or the starting products for forming the halogenated polysilanes, and the drying may take place according to any desired, existing known methods for the drying of gases and liquids.

In contrast to water, the siloxane-forming oxidizing agents give off, for example, reactive oxygen species, which may primarily attack bonds between two Si atoms, with formation of siloxanes.

Siloxanes used may be, for example, compounds of the following general formula

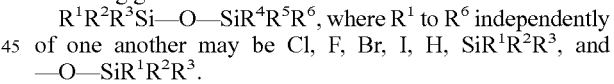

of one another may be Cl, F, Br, I, H, $SiR^1R^2R^3$, and —O—$SiR^1R^2R^3$.

These siloxanes may also comprise disiloxanes, for example hexachlorodisiloxane, which may be formed, for example, by reaction of oxygen or reactive oxygen species with hexachlorodisilane. A specific siloxane compound may also be trichlorosilylpentachlorodisiloxane which may be formed, for example, by reaction of octachlorotrisilane with oxygen. Likewise covered by the general formula are silols, which have a Si—OH group. Also possible are siloxanes having more than one Si—O—Si bond.

Siloxanes of this kind, or the siloxane-forming oxidizing agents, do not, in contrast to moisture such as water, have a tendency to enter into uncontrolled polymerizations with halogenated polysilanes, these polymerizations promoting formation of "poppy gels" or of solid, silica-like deposits in the apparatus. In process step a), for example, siloxanes can also be added by adding halogenated polysilanes which already include relatively large amounts of siloxanes.

As oxidizing agents which promote formation of siloxane it is possible, for example, to use dry oxygen, dry air, ozone, phosphine oxides, and combinations thereof. Phosphine oxides are particularly suitable for removing boron-containing impurities from halogenated polysilanes which are later used to produce high-purity silicon which is to be doped with phosphorus.

It is preferred, furthermore, at least to the boron-containing impurities, to add stoichiometric amounts of siloxanes and/or siloxane-forming oxidizing agents. Accordingly it is preferred to add at least 10 ppbw, more preferably at least 100 ppbw, of siloxane, and/or of siloxane-forming oxidizing agent, in process step a).

In this context, however, it must be borne in mind that a significant oxygen content in the halogenated polysilanes is for many applications undesirable including, for example, the photovoltaics industry and so, furthermore, it is preferred to add not more than 10 ppmw (parts per million per weight) of a siloxane-forming oxidizing agent or siloxane to prevent a situation in which after reaction of the siloxane-forming oxidizing agent and/or the siloxane itself with the boron-containing impurities, the excess of oxygen-containing compounds remaining in the halogenated polysilanes is too great.

The halogenated polysilanes may be generated in a mixture in which also the siloxanes and/or the siloxane-forming oxidizing agents are added. Thus it is possible, for example, to subject halogenated polysilanes to partial degradation by chlorination, resulting in particularly kinetically stable halogenated polysilanes having a large number of branches in the main chain, with the chlorine gas used for the chlorination at the same time containing at least 1 ppbw of siloxane and/or of siloxane-forming oxidizing agent, with the consequence that the halogenated polysilanes formed by the chlorination can at the same time be purified particularly easily by reaction of the siloxanes with the boron-containing impurities.

Furthermore, the halogenated polysilane may additionally comprise metal-containing impurities which, with the siloxane-forming oxidizing agent or siloxane itself, likewise form compounds which have a solubility and/or volatility different from the halogenated polysilanes. Impurities present may be, for example, titanium-, iron-, tin-, and/or aluminum-containing impurities or combinations thereof, which may form polyoxymetallates, for example heteropolymetallates, with the siloxanes, these metallates being able to be separated easily as, for example, by distillation or other methods, from the halogenated polysilanes. Phosphorus-containing impurities as well may form compounds with the siloxanes.

As starting compounds for the process, it is possible to use any desired impurities-containing mixtures of halogenated polysilanes, or else only individual compounds of halogenated polysilanes that have been provided with the impurities, examples of such compounds being hexachlorodisilane, octachlorotrisilane or dodecachloroneopentasilane, or any desired other silanes.

Furthermore, it is also possible to use starting compounds for the synthesis of the halogenated polysilanes in a wide variety of different versions of the processes, examples being monosilanes of the general formula $H_nSiX_{4-n}$ (X=F, Cl, Br, I; n=0-3).

These monosilanes may be reacted, for example, with inert gases such as nitrogen, or else together with reducing agents such as hydrogen, via thermal or plasma-chemical processes, for example, to give the halogenated polysilanes. Processes of this kind are described in WO 2009/143824 A1, WO 2006/125425 A1 and WO 2009/143823 A2, the subject matter of each of which is incorporated herein by reference.

It is possible in process step a) to operate at temperatures at room temperature to 150° C. Some of the halogenated polysilanes only dissolve at elevated temperatures.

Halogenated polysilanes of the following general formula:

$H_pSi_{n-p}X_{(2n+2)-p}$ with n=3 to 10; 0≤p≤2n+1, and X=F, Cl, Br, I may be used and/or prepared, in which case, in process step b), the halogenated polysilanes may be separated from the boron-containing compounds, formed by reaction with the siloxanes, by distillation.

In comparison to the relatively short-chain halogenated polysilanes having chain lengths n of between 3 and 10, which can be removed particularly easily from mixtures by distillation, the compounds formed by reaction of the siloxanes with the boron-containing impurities are frequently sparingly soluble and/or sparingly volatile, and so the halogenated polysilanes can be separated particularly simply, by a distillation from the impurities, and this results in halogenated polysilanes having an increased purity. In the case of halogenated polysilanes with a chain length of 5 Si atoms upward, it is also possible to employ crystallization techniques for the removal.

In the case of higher-chain halogenated polysilanes having chain lengths n of greater than 10, more particularly greater than 20, it is also possible in process step b) to carry out removal of the impurities from the halogenated polysilanes by, for example, sublimation, crystallization and/or zonal melting. In the case of zonal melting, the boron-containing compounds undergo preferential concentration in the melt, and so can be easily removed from the halogenated polysilanes. Removal of the compounds formed by the reaction of siloxanes with boron-containing impurities can also be carried out via crystallizing in the case of some short-chain polysilanes as, for example, dodecachloroneopentasilane and/or neo-$Si_6Cl_{14}$, since these halogenated polysilanes crystallize particularly readily from mixtures of halogenated polysilanes.

It is also possible to use the processes to prepare halogenated polysilanes of the general formula $Si_nX_{2n+2}$ with n=2 and X=F, Br, I, more particularly hexachlorodisilane.

Furthermore, it can be advantageous if during separation of the polysilanes, HCl is present in amounts up to 10% by mass, preferably up to 1% by mass, since hydrogen chloride may promote formation of compounds by reaction of the siloxanes with the boron- and/or metal-containing impurities. HCl here may also come from the preparation procedure of the halogenated polysilanes, or may be added separately.

There is no need for water to be present. So, formation of friction-sensitive decomposition products, the "poppy gels" and the insoluble solids such as the silica-like deposits, for example, can be largely avoided.

Furthermore, alcohols and/or amines may be present in amounts of not more than 1 ppmw. Amines and alcohols may lead to reactions and rearrangements, and should therefore, where possible, be avoided.

Furthermore, in process step b), formation of further siloxanes may be avoided. This may be especially advantageous when it is already being ensured in process step a) that sufficient amounts of siloxanes are formed so that, after reaction of the siloxanes with the boron- and metal-containing impurities, only extremely small amounts of the siloxanes still remain in the halogenated polysilane mixtures.

Furthermore, the hydrogen content of the halogenated polysilanes may be less than 2 atom %, more particularly less than 1 atom %. The halogenated polysilanes here may also comprise halogen substituents of two or more different halogens.

More particularly, the substituents of the halogenated polysilane may consist exclusively of halogen. The halogenated polysilanes can be obtained as fine chemicals with a very high degree of purity of at least 99.5%. The impurities may amount to less than 10 ppm.

Furthermore, process steps a) and b) may be operated at a pressure of 0.8 to 300 hPa. It is possible to operate at this pressure more particularly in the course of the distillation, sublimation, and addition of the siloxane or of the siloxane-forming oxidizing agent.

In the case of halogenated polysilanes whose substituents consist exclusively of halogens, it is also possible for extremely small amounts of other substituents, examples being hydrogen substituents, to be present, but in this case the purity may still be higher than 99.9%.

In the text below, our methods are elucidated in more detail, using a working example:

In the first step, $(SiCl_2)_x$ with x=9 to 25 is prepared, as an orange-brown, viscous oil, from $SiCl_4$ vapor and hydrogen in a plasma reaction in accordance with the technical teaching of WO 2009/143823 A2.

A solution of $(SiCl_2)_x$ in $SiCl_4$ was decomposed at <450° C. under a pressure of 300 hPa over 6 hours to give a red-colored product with the composition $SiCl_{0.5}$. 9 g of this material were suspended in 55 g of $Si_2Cl_6$. At 120° C., chlorine gas, containing 5 ppmw of oxygen as siloxane-forming oxidizing agent, was introduced. After 10 hours, the reaction mixture no longer took up any chlorine gas. A $^{29}Si$ NMR spectrum of the liquid showed only a very weak signal of $SiCl_4$, in addition to a strong signal of $Si_2Cl_6$.

Other chlorosilanes are present at most in a small amount. Distillative work-up of the product gave 8% by mass of a fraction of $SiCl_4$ with a little $Si_2Cl_6$, and 85% by mass of a further fraction comprising $Si_2Cl_6$. The distillation residue, of 7% by mass, consisted largely of $Si_2Cl_6$ with small amounts of insoluble solids. A comparison of the boron content of the resultant $Si_2Cl_6$, of ≤10 µg/kg, with the boron content of the $SiCl_4$ starting material, of ≤500 µg/kg. shows that over the entire preparation procedure it was possible to achieve very effective removal of the boron from the halosilanes, from initially about 0.5 ppmw to less than 10 ppbw. The iron content falls from ≤100 µg/kg in the $SiCl_4$ to <10 µg/kg in the $Si_2Cl_6$, and the amount of aluminum drops from ≤100 µg/kg in the $SiCl_4$ to <20 µg/kg in the $Si_2Cl_6$.

The invention claimed is:

1. A process for preparing a halogenated mono-or polysilane $H_pSi_{n-p}X_{(2n+2)-p}$ with n=1 to 50; 0≤p≤2n+1, and X=F, Cl, Br, I, as an individual compound or a mixture of compounds, from a mixture which comprises the halogenated mono-or polysilane or in which the halogenated mono-or polysilane is formed, additionally comprising boron-containing impurities, wherein
   a) the mixture is admixed with at least 1 ppbw (parts per billion per weight) of a siloxane-forming oxidizing agent, the boron-containing impurities forming compounds having a volatility and/or solubility different from the halogenated polysilanes,
   b) the halogenated mono-or polysilane is separated from the compound(s), and
   c) not more than 1 ppmw of water and not less than 1 ppb of siloxanes are present, and
   wherein the siloxane-forming oxidizing agent is selected from the group consisting of dry oxygen, dry air, ozone, and phosphine oxides and combinations thereof.

2. The process according to claim 1, wherein at least 10 ppbw (parts per million per weight) of a siloxane-forming oxidizing agent are added.

3. The process according to claim 1, wherein the halogenated mono-or polysilane further comprises metal-containing impurities which with the siloxane-forming oxidizing agent form the compounds having a volatility and/or solubility which is different from the halogenated polysilanes.

4. The process according to claim 3, wherein the metal-containing impurities are selected from the group consisting of Ti-, Fe-, Sn- and Al-containing impurities and combinations thereof.

5. The process according to claim 1, wherein step a) operates at a temperature of room temperature to 150° C.

6. The process according to claim 1, wherein, in step b), the halogenated mono-or polysilane is separated from the compound(s) by distillation, sublimation, crystallization and/or zonal melting.

7. The process according to claim 1, wherein, when n=3 to 10; 0≤p≤2n+1, and X=F, Cl, Br, I, step b) separates the halogenated monosilane or polysilanes from the compounds by distillation.

8. The process according to claim 1, which prepares a halogenated polysilane $Si_nX_{2n+2}$ wherein n=2 and X=F, Br, I or Cl.

9. The process according to claim 1, wherein, during isolation of the halogenated monosilane or polysilanes, HCl is present in amounts up to 10% by mass.

10. The process according to claim 1, wherein no water is present.

11. The process according to claim 1, wherein alcohols and/or amines are present in amounts of not more than 1 ppmw.

12. The process according to claim 1, wherein formation of further siloxanes during step b) is avoided.

13. The process according to claim 1, wherein hydrogen content of the halogenated mono-or polysilane is less than 2 atom %.

14. The process according to claim 1, wherein the substituents of the halogenated polysilane consist of halogen.

15. A process for preparing a halogenated mono-or polysilane $H_pSi_{n-p}X_{(2n+2)-p}$ with n=1 to 50; 0≤p≤2n+1, and X=F, Cl, Br, I, as an individual compound or a mixture of compounds, from a mixture which comprises the halogenated mono-or polysilane or in which the halogenated mono-or polysilane is formed, additionally comprising boron-containing impurities, wherein
   a) the mixture is admixed with at least 1 ppbw (parts per billion per weight) of a siloxane-forming oxidizing agent or siloxane, the boron-containing impurities forming compounds having a volatility and/or solubility different from the halogenated polysilanes,
   b) the halogenated mono-or polysilane is separated from the compound(s), and
   c) not more than 1 ppmw of water and not less than 1 ppb of siloxanes are present, and
   wherein the halogenated mono-or polysilane comprises halogen substituents of two or more different halogens.

16. A process for preparing a halogenated mono-or polysilane $H_pSi_{n-p}X_{(2n+2)-p}$ with n=1 to 50; 0≤p≤2n+1, and X=F, Cl, Br, I, as an individual compound or a mixture of compounds, from a mixture which comprises the halogenated mono-or polysilane or in which the halogenated mono-or polysilane is formed, additionally comprising boron-containing impurities, wherein a) the mixture is admixed with at least 1 ppbw (parts per billion per weight) of a siloxane-forming oxidizing agent or siloxane, the boron-containing impurities forming compounds having a volatility and/or solubility different from the halogenated polysilanes,
b) the halogenated mono-or polysilane is separated from the compound(s), and
c) not more than 1 ppmw of water and not less than 1 ppb of siloxanes are present, and
wherein steps a) and b) operate at a pressure of 0.8-300 hPa.

* * * * *